US011297290B2

(12) United States Patent
Hosaka et al.

(10) Patent No.: US 11,297,290 B2
(45) Date of Patent: Apr. 5, 2022

(54) PROJECTOR AND METHOD FOR CONTROLLING PROJECTOR

(71) Applicant: SEIKO EPSON CORPORATION, Tokyo (JP)

(72) Inventors: Hiroyuki Hosaka, Matsumoto (JP); Tetsuro Yamazaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/672,589

(22) Filed: Nov. 4, 2019

(65) Prior Publication Data

US 2020/0145627 A1    May 7, 2020

(30) Foreign Application Priority Data

Nov. 5, 2018   (JP) .............................. JP2018-208272

(51) Int. Cl.
*H04N 9/31* (2006.01)
*G02F 1/13363* (2006.01)
*G02F 1/1335* (2006.01)

(52) U.S. Cl.
CPC ....... *H04N 9/3155* (2013.01); *G02F 1/13363* (2013.01); *G02F 1/133553* (2013.01); *H04N 9/3197* (2013.01)

(58) Field of Classification Search
CPC ............. G09G 3/007; G03B 21/00–64; H04N 9/31–3197
See application file for complete search history.

(56) References Cited

U.S. PATENT DOCUMENTS

| | | | |
|---|---|---|---|
| 6,657,603 B1 * | 12/2003 | Demetrescu | G09G 3/002 345/32 |
| 7,034,811 B2 * | 4/2006 | Allen | G09G 3/002 345/204 |
| 2018/0146179 A1 * | 5/2018 | Ohno | G03B 21/145 |

FOREIGN PATENT DOCUMENTS

| | | |
|---|---|---|
| JP | H04-063332 A | 2/1992 |
| JP | 2005-195909 A | 7/2005 |
| JP | 2008-268677 A | 11/2008 |
| JP | 2012-013766 A | 1/2012 |
| JP | 2016-126096 A | 7/2016 |
| JP | 2018-120086 A | 8/2018 |

* cited by examiner

*Primary Examiner* — Michelle M Iacoletti
*Assistant Examiner* — Christopher A Lamb, II
(74) *Attorney, Agent, or Firm* — Oliff PLC

(57) ABSTRACT

A projector is provided that includes a light source configured to radiate light, an electro-optical panel including a pixel circuit configured to receive light from the light source and emit the light, and an optical axis shifting element configured to shift an optical axis of the light emitted from the pixel circuit, with the projector being configured to display a pixel on a projection surface, based on the light emitted from the pixel circuit via the optical axis shifting element. When shifting a position of the pixel on the projection surface from a first position to a second position in a first direction, the optical axis shifting element shifts an optical axis of the light emitted from the pixel circuit using a path different from a shortest path from the first position to the second position.

1 Claim, 14 Drawing Sheets

PROJECTOR AND METHOD FOR CONTROLLING PROJECTOR

The present application is based on and claims priority from JP Application Serial Number 2018-208272, filed Nov. 5, 2018, the disclosure of which is hereby incorporated by reference herein in its entirety.

BACKGROUND

1. Technical Field

The present disclosure relates to a projector and a method for controlling the projector.

2. Related Art

In general, a liquid crystal panel includes a plurality of liquid crystal elements (liquid crystal capacitors) in which liquid crystals are held between a pair of electrodes, and one liquid crystal element has a transmittance, that is, a brightness, corresponding to a voltage applied to the liquid crystal element. The transmittance of the liquid crystal element is then controlled by applying a voltage corresponding to a gray scale level of a pixel of a target image to each of the plurality of liquid crystal elements to display the image.

Note that, while the liquid crystal element used may be a reflection type, the liquid crystal element will be described in the present disclosure as a transmissive type for ease of explanation. Thus, a relative ratio of light passing through the liquid crystal element is described herein as transmittance. This term, however, should be read as reflectance when a reflection type is used.

In recent years, liquid crystal projectors that use such a liquid crystal panel to project a large picture plane on a screen have become widespread. The liquid crystal projector is, for example, configured to split light from a light source into the three primary colors of red, green, and blue, assign and transmit light of each color to each liquid crystal panel, synthesize a transmitted image of each color, enlarge the transmitted image by an optical system such as a lens, and project the transmitted image onto a projection surface such as screen.

Further, there is known a technique in which, in a liquid crystal projector, a position of a pixel projected onto a projection surface is shifted by an optical axis shifting element in order to artificially increase a resolution. Specifically, according to this technique, one frame period is divided into a plurality of unit periods, and the optical axis shifting element is controlled so that a position of a pixel projected onto a screen or the like is shifted per unit period, making it appear as if there is a greater number of pixels projected than the number of liquid crystal elements included in the liquid crystal panel (refer to, for example, JP-A-4-063332).

Nevertheless, even when a voltage is applied to the liquid crystal element, the transmittance of the liquid crystal element changes to a value corresponding to the applied voltage relatively slowly, not immediately. Thus, when one pixel to be projected is observed, the pixel may change from a brightness in a certain unit period to a brightness in the next unit period as the position is shifted. When the brightness changes in the pixel to be projected as the position is shifted in this way, the problem arises that the change in brightness is superimposed on the brightness of the positions before and after shifting, resulting in a reduction in resolution.

SUMMARY

An electro-optical device according to an aspect of the present disclosure is a projector including a light source configured to radiate light, an electro-optical panel including a pixel circuit configured to receive light from the light source and emit the light, and an optical axis shifting element configured to shift an optical axis of the light emitted from the pixel circuit, with the projector being configured to display a pixel on a projection surface, based on the light emitted from the pixel circuit via the optical axis shifting element. When shiftig a position of the pixel on the projection surface from a first position to a second position in a first direction, the optical axis shifting element shifts an optical axis of the light emitted from the pixel circuit using a path different from a shortest path from the first position to the second position.

DESCRIPTION OF EXEMPLARY EMBODIMENTS

Hereinafter, modes for carrying out the present disclosure will be described with reference to accompanying drawings. However, in each figure, a size and a scale of each unit is different from the actual size and the actual scale of each unit as appropriate. Moreover, exemplary embodiments described below are suitable specific examples of the disclosure, and various technically preferable limitations are applied, but the scope of the disclosure is not limited to these modes unless it is specifically described in the following description to limit the disclosure.

A liquid crystal projector 1 according to a first exemplary embodiment is described below.

Figure 1:
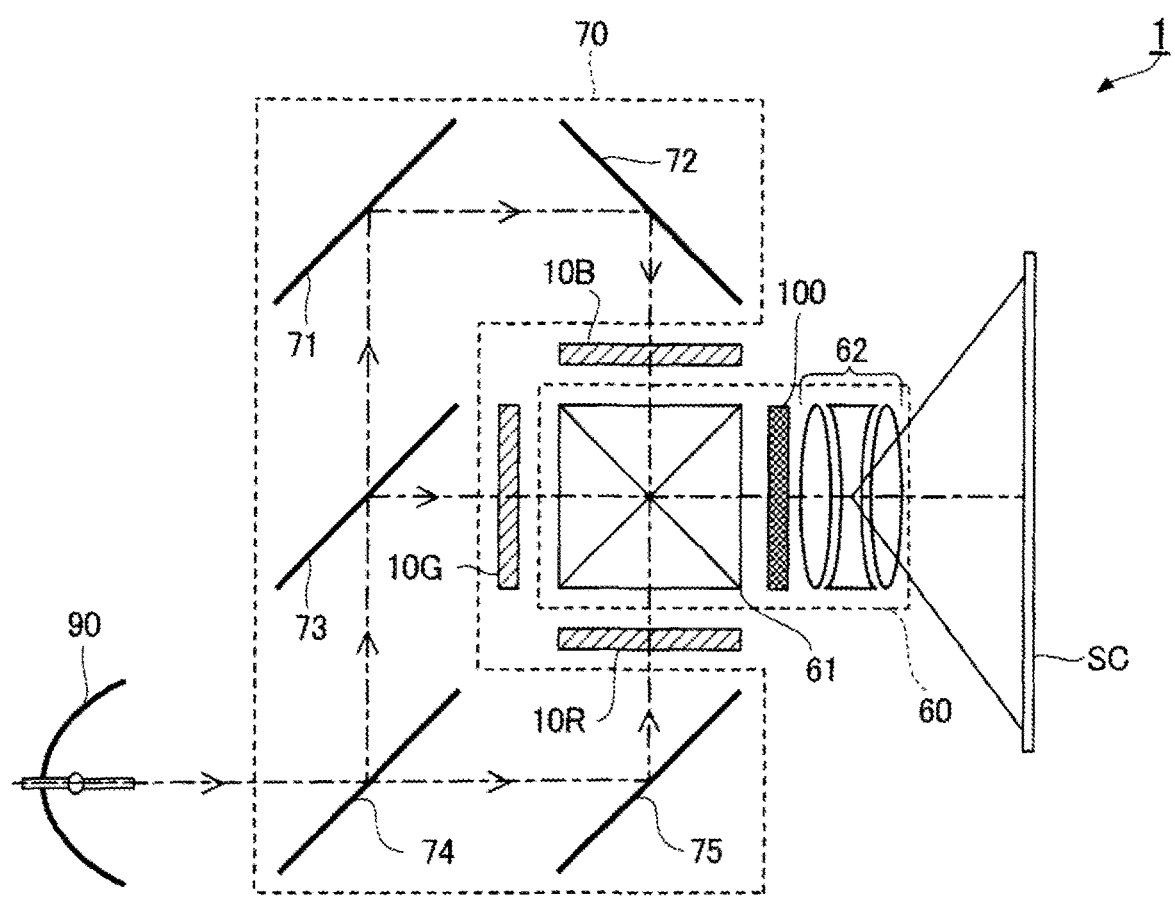
FIG. 1 is a diagram illustrating an optical system of a liquid crystal projector according to a first exemplary embodiment.

FIG. 1 is a diagram illustrating an example of a configuration of an optical system of the liquid crystal projector 1 according to the first exemplary embodiment. As illustrated in FIG. 1, the optical system of the liquid crystal projector 1 includes an illumination device 90, a separation optical system 70, three liquid crystal panels 10R, 10G, 10B, and a projection optical system 60. The illumination device 90 is a white light source that uses, for example, a halogen lamp, and radiates light. Note that the illumination device 90 is an example of a light source.

The separation optical system 70 includes three mirrors 71, 72, 75, and dichroic mirrors 73, 74. The separation optical system 70 separates white light emitted from the illumination device 90 into the three primary colors red, green, and blue. Hereinafter, red is referred to as "R", green is referred to as "G", and blue is referred to as "B". Specifically, of the white light, the dichroic mirror 74 transmits light of the wavelength region of R, and reflects light of the wavelength regions of G and B. Of the light of the wavelength regions of G and B reflected by the dichroic mirror 74, the dichroic mirror 73 transmits light of the wavelength region of R, and reflects light of the wavelength region of G.

Light corresponding to the separated R, G, and B is guided to liquid crystal panels 10R, 10G, 10B, respectively. The liquid crystal panels 10R, 10G, 10B are used as spatial light modulators. Note that, in the following, when the liquid crystal panels 10R, 10G, and 10B are not differentiated, the liquid crystal panel may be referred to as the liquid crystal panel 10.

The projection optical system 60 includes a dichroic prism 61, a projection lens system 62, and an optical axis shifting element 100. The light modulated by each of the liquid crystal panels 10R, 10G, 10B is incident on the dichroic prism 61 from three directions. In this dichroic prism 61, the transmitted images of R, G, and B are synthesized, and a full color image is emitted. The optical axis shifting element 100 and the projection lens system 62 are disposed on an exit side of the dichroic prism 61. The optical axis shifting element 100 shifts the optical axis in the exiting direction from the dichroic prism 61, and the projection lens system 62 enlarges and projects the light emitted from the optical axis shifting element 100 onto a projection surface SC such as a screen.

Figure 2:
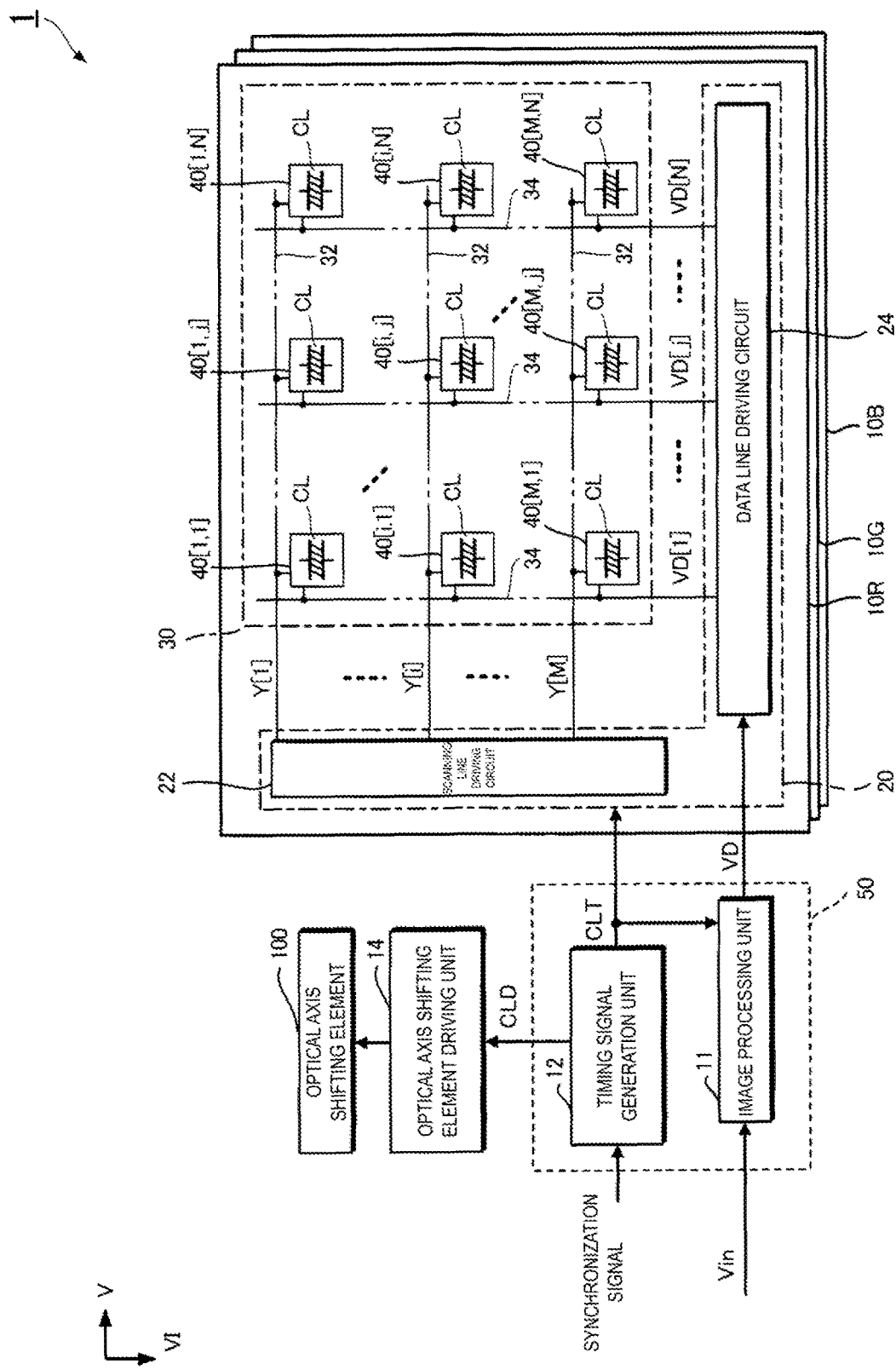
FIG. 2 is a block diagram illustrating a control system of the liquid crystal projector.

FIG. 2 is a block diagram illustrating a configuration example of a control system of the liquid crystal projector 1. The control system of the liquid crystal projector 1 includes the three liquid crystal panels 10R, 10G, 10B, a control unit 50, an optical axis shifting element driving unit 14, and the optical axis shifting element 100. When one of the liquid crystal panels 10R, 10G, 10B is observed, the liquid crystal panel 10 includes a display unit 30 in which a plurality of pixel circuits 40 are arranged, and a driving circuit 20 configured to drive each of the pixel circuits 40. Note that the liquid crystal panel 10 is an example of an electro-optical panel.

As illustrated in FIG. 2, M scanning lines 32 extending in a V direction and N data lines 34 extending in a VI direction intersecting with the V direction are formed in the display unit 30 of the liquid crystal panel 10. M and N are integers of two or greater. The plurality of pixel circuits 40 are provided correspondingly to intersections of the scanning lines 32 and the data lines 34 in the display unit 30. Thus, the pixel circuits 40 are arranged in M vertical rows and N horizontal columns.

Note that, in the following description, in order to distinguish and describe a particular pixel circuit 40, the pixel circuit 40 corresponding to the intersection between the scanning line 32 in the i-th row and the data line 34 in the j-th column is expressed as [i, j]. Here, i is an integer that satisfies $1 \leq i \leq M$, and j is an integer that satisfies $1 \leq j \leq N$.

The driving circuit 20 includes a scanning line driving circuit 22 and a data line driving circuit 24, and writes a voltage corresponding to a gray scale level to each of the pixel circuits 40. Specifically, in the driving circuit 20, the scanning line driving circuit 22 sequentially supplies scanning signals Y [1], Y [2], Y [3], . . . , Y [M] to the scanning lines 32 in the first row, the second row, the third row, . . . , the M-th row in accordance with a timing signal generation unit 12. Specifically, the scanning line driving circuit 22 sequentially exclusively selects the scanning line 32 from the first row to the M-th row across each unit period to supply a scanning signal at an active level (H level) to the selected scanning line 32, and supply a scanning signal of the non-active level (L level) to the scanning line 32 not selected. Thus, the scanning signals Y [1] to Y [M] are sequentially exclusively active levels across each unit period.

The data line driving circuit 24 supplies data signals VD [1] to VD [N] to the data lines 34 in the first to the N-th columns in synchronization with selection of the scanning line 32 by the scanning line driving circuit 22.

Note that the driving circuit 20 is an example of a pixel circuit driving unit.

Here, for the sake of convenience, the pixel circuit 40 will be described. Note that the pixel circuits 40 arranged in M rows and N columns are configured electrically identical to each other, and thus the pixel circuit 40 [i, j] in the i-th row and j-th column will be described as an example.

Figure 3:
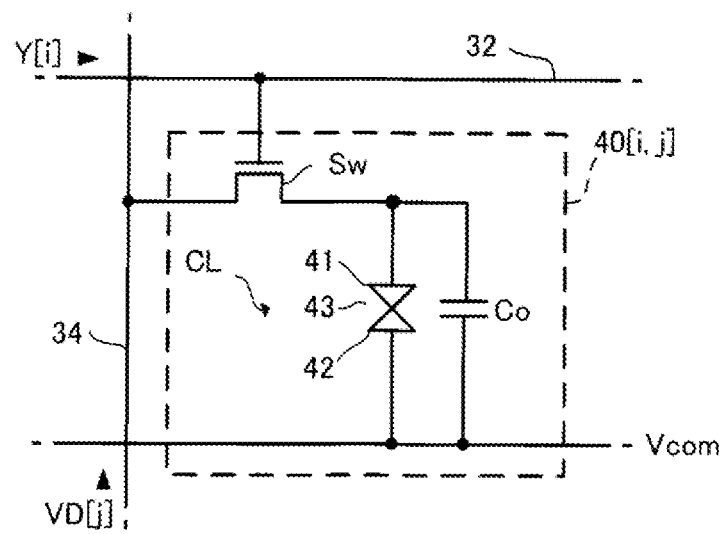
FIG. 3 is a diagram illustrating an equivalent circuit of a pixel circuit of the liquid crystal projector.

FIG. 3 is a diagram illustrating an equivalent circuit of the pixel circuit 40 [i, j]. As illustrated in FIG. 3, the pixel circuit 40 [i, j] includes a liquid crystal element CL, a selection switch Sw, and a storage capacitor Co. Of these, the selection switch Sw is, for example, an N-channel type thin film transistor, with a gate node coupled to the scanning line 32 of the i-th row, a source node coupled to the data lines 34 of the j-th column, and a drain node coupled to one end of a pixel electrode 41 and the storage capacitor Co, respectively. Thus, when the scanning signal Y [i] supplied to the scanning line 32 of the i-th row is at the H level, the selection switch Sw is turned on, and thus the data signal VD [j] supplied to the data line 34 in the j-th column is supplied to the pixel electrode 41 via the switch Sw.

The liquid crystal element CL has a configuration in which a liquid crystal 43 is sandwiched between the pixel electrode 41 and a common electrode 42. The common electrode 42 is common across the pixel circuits 40 arranged in M rows and N columns, and is maintained at a voltage Vcom.

In such a liquid crystal element CL, when the scanning signal Y [i] is at the H level, a voltage of the data signal VD [j] is applied to the pixel electrode 41. The voltage applied to the pixel electrode 41 is held by the capacitance of the liquid crystal element CL even when the scanning signal Y [i] is at an L level and the selection switch Sw is turned off. The molecular arrangement of the liquid crystal 43 sandwiched by the pixel electrode 41 and the common electrode 42 in the liquid crystal element CL is arranged in a direction corresponding to the voltage between the pixel electrode 41 and the common electrode 42. Thus, in the liquid crystal element CL, the transmittance is, by a polarizer (not illustrated), minimized when the voltage effective value applied to the liquid crystal element CL is zero, for example, and gradually increased and eventually maximized (in normally-black mode) as the voltage effective value increases.

In this manner, in the pixel circuit 40 [i, j], the voltage of the data signal VD [j] when the scanning signal Y [i] reaches the H level is written, resulting in transmittance in accordance with the voltage.

Note that the storage capacitor Co is provided in parallel with the liquid crystal element CL in order to increase the apparent capacitance of the liquid crystal element CL. That is, one end of the storage capacitor Co is coupled to the pixel electrode 41, and the other end is coupled to the common electrode 42. The other end of the storage capacitor Co may be configured to be maintained at a voltage other than the voltage Vcom, provided that the voltage is constant.

The description will now return to FIG. 2. The control unit 50 includes an image processing unit 11 and the timing signal generation unit 12, and is configured to control writing by the driving circuit 20 of the liquid crystal panels 10R, 10G, 10B and the supply of the data signal VD in synchronization with the writing, as well as control the optical axis shift of the optical axis shifting element 100 via the optical axis shifting element driving unit 14 on the basis of a synchronization signal and an image signal Vin supplied in synchronization with the synchronization signal, from an upper circuit (not illustrated).

The timing signal generation unit 12 generates control signals CLT, CLD on the basis of the synchronization signal, supplies the generated control signal CLT to the driving circuit 20 and the image processing unit 11, and supplies the generated control signal CLD to the optical axis shifting element driving unit 14.

In the present exemplary embodiment, one frame period is divided into four unit periods. Then, the timing signal generation unit 12 controls the driving circuit 20 so that, in each unit period, voltages corresponding to the gray scale level are written to each of the pixel circuits 40 in the M rows and N columns. On the other hand, the control signal CLD is generated so that an optical axis shift corresponding to the writing is made in each unit period.

Here, "one frame period" refers to a period required to execute shifting P times when a single pixel is to be shifted P times, thereby setting display information to a magnification P. In the above example, P is set to "4".

Further, the timing signal generation unit 12 causes the image processing unit 11 to process the image signal Vin in accordance with the control signal CLT, and causes the data signal VD corresponding to the pixel at the position to be shifted to be supplied in accordance with the writing of the driving circuit 20, in each unit period.

Note that, while the illustration is simplified in FIG. 2, in reality, of the image signal Vin, the data signal of the R component subjected to signal processing is supplied to the liquid crystal panel 10R. Similarly, the data signal of the G component subjected to signal processing is supplied to the liquid crystal panel 10G, and the data signal of the B component subjected to signal processing is supplied to the liquid crystal panel 10B.

Figure 4:
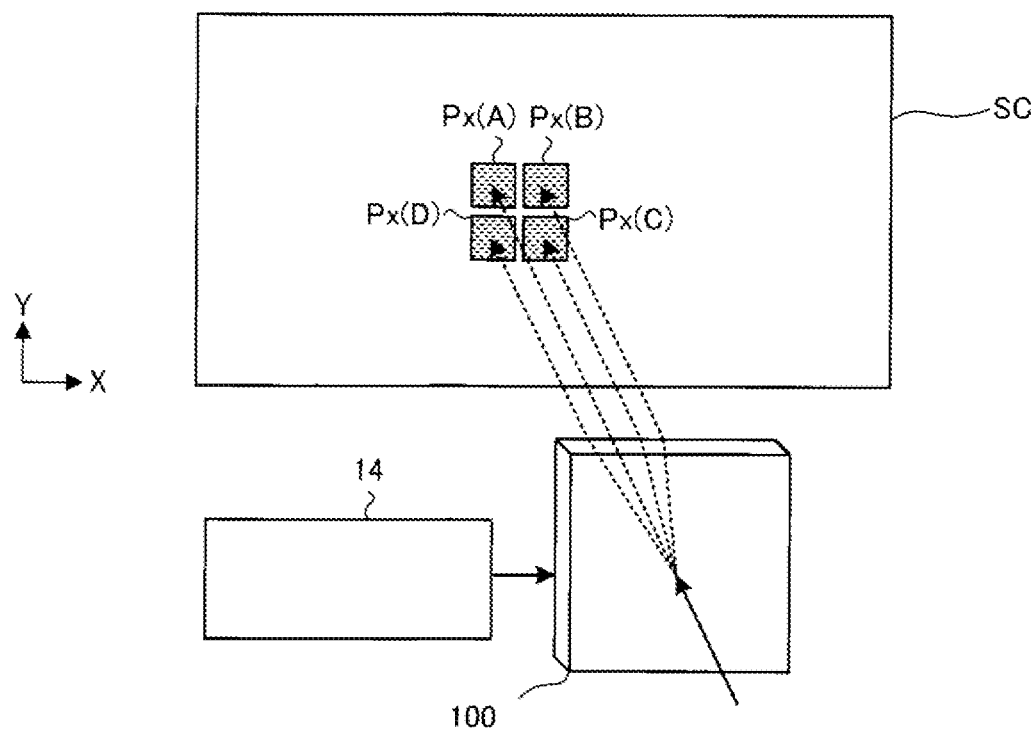
FIG. 4 is a diagram for explaining an operation of an optical axis shifting element of the liquid crystal projector.

FIG. 4 is a diagram for explaining the optical axis shift by the optical axis shifting element 100.

For convenience of explanation, a horizontal rightward direction of the projection surface SC is referred to as a +X direction, and a vertical upward direction is referred to as a +Y direction. Further, one pixel projected onto the projection surface SC and displayed on the projection surface SC is denoted as reference numeral Px. Note that, in FIG. 4, four pixels Px are illustrated. However, these pixels Px are meant only to describe positions shifted sequentially by the optical axis shifting element 100, and are not meant to indicate that one pixel is simultaneously separated and projected in four positions.

In addition, the shape of the pixel Px projected on the projection surface SC and displayed on the projection surface SC is substantially square in order to simplify the description. Note that the shape of the pixel Px is not limited to a square, and may be a rectangle, including a square and a rectangular, or may be a parallelogram.

The optical axis shifting element 100 is configured to be capable of shifting the optical axis of emitted light relative to the optical axis of incident light in any amount in a two-dimensional direction across the X direction and the Y direction by birefringence in accordance with applied voltage. Actually, because the optical axis shifting element driving unit 14 applies a voltage in accordance with the control signal CLD to the optical axis shifting element 100, the timing signal generation unit 12 is configured to control the optical axis shift by the optical axis shifting element 100 via the optical axis shifting element driving unit 14.

In the present exemplary embodiment, the optical axis shifting element 100 provided on the exit surface of the dichroic prism 61 sequentially shifts the position of the pixel Px displayed on the projection surface SC to the following four positions across four unit periods.

Specifically, given A as the position of the pixel Px displayed on the projection surface SC when the optical axis is not shifted by the optical axis shifting element 100, B is the position of the pixel Px shifted by one position in the +X direction relative to the position A, C is the position of the pixel Px shifted by one position in the −Y direction relative to position B, and D is the position of the pixel Px shifted by one position in the −X direction relative to the position C.

Note that the +X direction is an example of a first direction. The −Y direction is an example of a second direction. The −X direction is an example of a third direction. The +Y direction is an example of a fourth direction. Further, the position A is an example of a first position, the position B is an example of a second position, the position C is an example of a third position, and the position D is an example of a fourth position.

Further, because the position A to the position D may be a relative relationship, the position A when the optical axis is not shifted does not need to be used as standard.

In the present exemplary embodiment, the position of the pixel Px projected onto the projection surface SC by the optical axis shifting element 100 and displayed on the projection surface SC is shifted from position A to position B, from position B to position C, from position C to position D, and from position D to position A using not the respective shortest linear paths, but rather paths such as described below.

Figure 5:
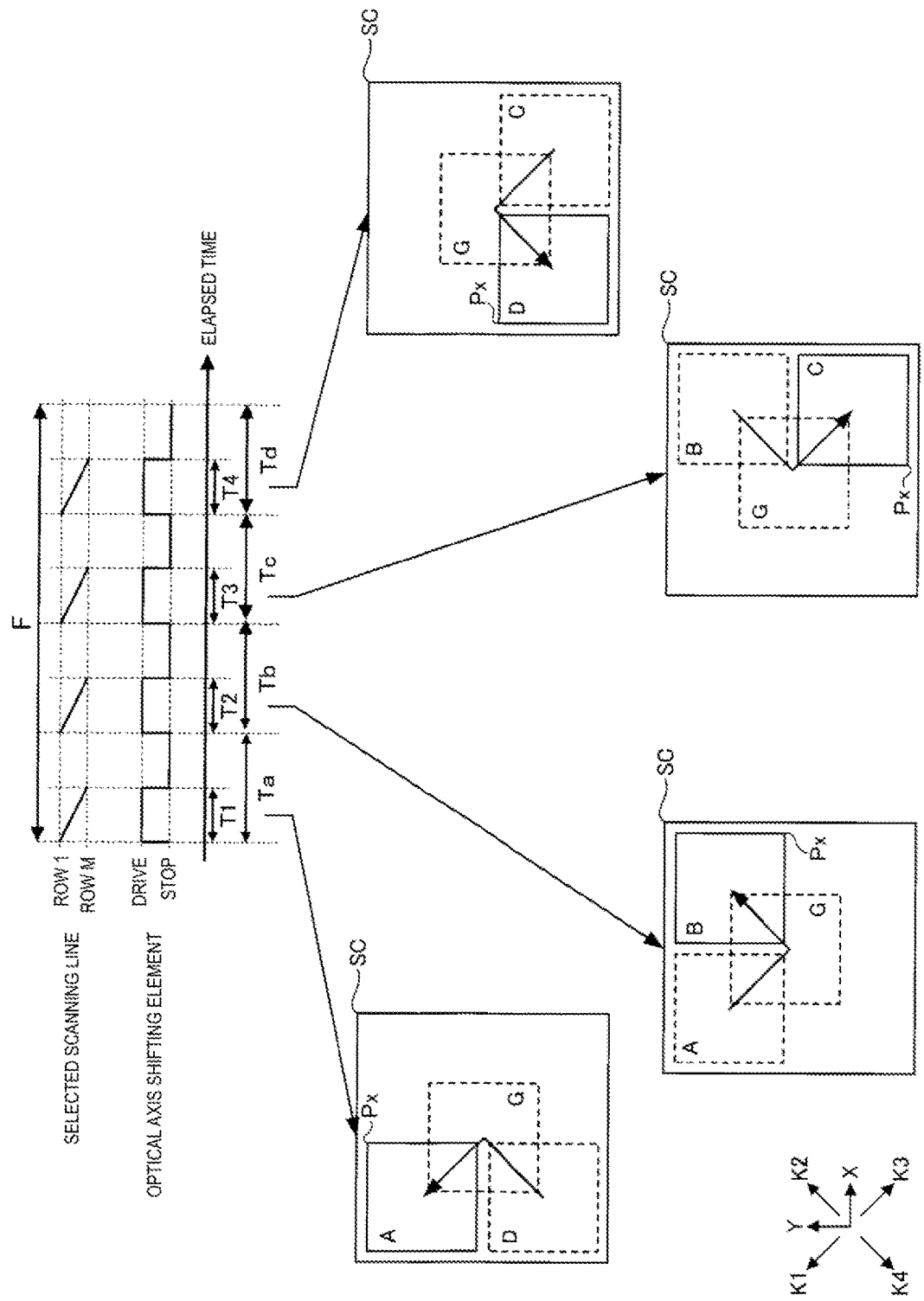
FIG. 5 is a diagram illustrating a relationship between an optical axis shift operation and a write operation of the pixel circuit.

FIG. 5 is a diagram illustrating a relationship between an optical axis shift operation of the optical axis shifting element 100 and a write operation to the pixel circuit 40 by the driving circuit 20.

In the present exemplary embodiment, one frame period F is divided into four unit periods Ta, Tb, Tc, Td. In the unit period Ta, the data signal corresponding to the pixel Px in position A is written. Specifically, the scanning line driving circuit 22 sequentially selects the scanning line 32 from the first row to the M-th row in the period T1 of the unit period Ta, the image processing unit 11 supplies the data signals VD corresponding to one row positioned in the selected scanning line 32, which is the pixel corresponding to position A, to the data line driving circuit 24, and the data line driving circuit 24 respectively supplies the supplied data signals VD of the one row to the data lines 34 in the corresponding columns.

Note that FIG. 5 illustrates a temporal shift of the scanning line selected by the scanning signals Y [1] to Y [M] when the first row to the M-th row, which are the number of rows of the scanning line 32, are on the vertical axis, and elapsed time is on the horizontal axis.

When the selected period of the scanning line is indicated by a black line for each scanning line, the scanning line 32 is sequentially exclusively selected for each row, and thus the selected scanning line transitions from the first line to the M-th line with the elapse of time. As a result, the set of black lines indicating the selected scanning line is shown as continuous points that slope downward with the elapse of time. For the sake of simplicity, the selected scanning line is shown as a downward sloping solid line.

In the period T1, of the unit period Ta, in which the scanning line 32 is selected from the first row to the M-th row, the timing signal generation unit 12 controls the optical axis shift by the optical axis shifting element 100 via the optical axis shifting element driving unit 14 so that the pixel Px is shifted in a path such as follows.

Specifically, as illustrated in FIG. 5, in the period T1, the pixel Px is shifted from position D to position G, and in particular from position D to position G separated from position D in the K2 direction by half of the diagonal of the pixel Px, and subsequently is shifted from position G to position A in the K1 direction.

Note that position G includes (overlaps with) position A, position B, position C, and position D and, in this example, a diagonal center of position G coincides with the center of the four pixels of position A, position B, position C, and position D. Further, the K2 direction refers to a direction in which the +Y direction is rotated 45 degrees clockwise, and the K1 direction refers to a direction in which the +Y direction is rotated 45 degrees counter-clockwise. Position G is an example of a fifth position.

In the remaining period of the unit period Ta after the period T1 has elapsed, a data signal is not written and the pixel Px is fixed to position A.

In the next unit period Tb, the data signal corresponding to the pixel Px in position B is written. Specifically, the scanning line driving circuit 22 sequentially selects the scanning line 32 from the first row to the M-th row in the period T2 of the unit period Tb, the image processing unit 11 supplies the data signals VD corresponding to one row positioned in the selected scanning line 32 to the data line driving circuit 24, and the data line driving circuit 24 respectively supplies the supplied data signals VD corresponding to the one row to the data lines 34 in the corresponding columns.

In the period T2, of the unit period Tb, the timing signal generation unit 12 controls the optical axis shift by the optical axis shifting element 100 via the optical axis shifting element driving unit 14 so that the pixel Px is shifted using a path such as follows.

Specifically, as illustrated in FIG. 5, in the period T2, the pixel Px is shifted from position A to position G in the K3 direction, and subsequently shifted from position G to position B in the K2 direction.

Note that the K3 direction is a direction opposite to the K1 direction.

In the remaining period of the unit period Ta after the period T2 has elapsed, a data signal is not written and the pixel Px is fixed to position B.

In the next unit period Tc, the data signal corresponding to the pixel Px in position C is written. Specifically, the scanning line driving circuit 22 sequentially selects the scanning line 32 from the first row to the M-th row in the period T3 of the unit period Tc, the image processing unit 11 supplies the data signals VD corresponding to one row positioned in the selected scanning line 32 to the data line driving circuit 24, and the data line driving circuit 24 respectively supplies the supplied data signals VD corresponding to the one row to the data lines 34 in the corresponding columns.

In the period T3, of the unit period Tc, the timing signal generation unit 12 controls the optical axis shift by the optical axis shifting element 100 via the optical axis shifting element driving unit 14 so that the pixel Px is shifted using a path such as follows.

Specifically, as illustrated in FIG. 5, in the period T3, the pixel Px is shifted from position B to position G in the K4 direction, and subsequently shifted from position G to position C in the K3 direction.

Note that the K4 direction is a direction opposite to the K2 direction.

In the remaining period of the unit period Tc after the period T3 has elapsed, a data signal is not written and the pixel Px is fixed to position C.

In the unit period Td, the data signal corresponding to the pixel Px in position D is written. Specifically, the scanning line driving circuit 22 sequentially selects the scanning line 32 from the first row to the M-th row in the period T4 of the unit period Td, the image processing unit 11 supplies the data signals VD corresponding to one row positioned in the selected scanning line 32 to the data line driving circuit 24, and the data line driving circuit 24 respectively supplies the supplied data signals VD corresponding to the one row to the data lines 34 in the corresponding columns.

In the period T4, of the unit period Td, the timing signal generation unit 12 controls the optical axis shift by the optical axis shifting element 100 via the optical axis shifting element driving unit 14 so that the pixel Px is shifted using a path such as follows.

Specifically, as illustrated in FIG. 5, in the period T4, the pixel Px is shifted from position C to position G in the K1 direction, and subsequently shifted from position G to position D in the K4 direction.

In the remaining period of the unit period Td after the period T4 has elapsed, a data signal is not written and the pixel Px is fixed to position D.

Note that the optical axis shift operation of the optical axis shifting element 100 and the write operation to the pixel circuit 40 by the driving circuit 20 can be expressed using a flowchart such as follows.

Figure 6:
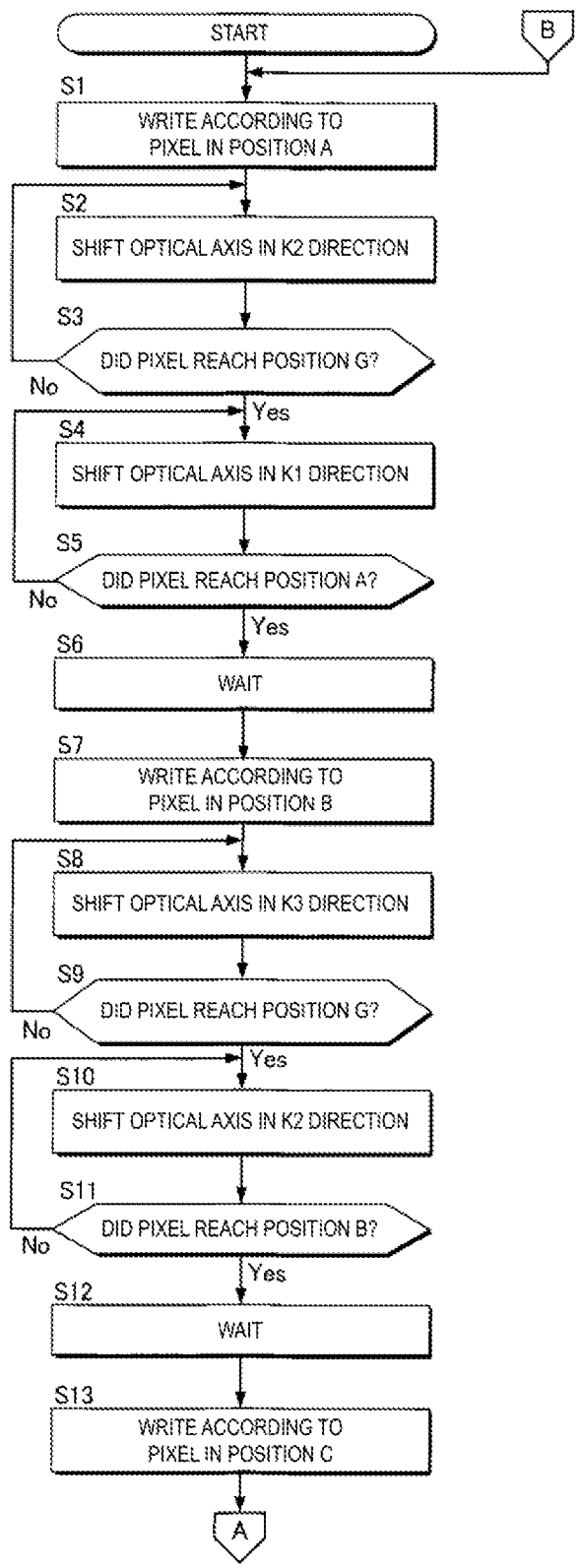
FIG. 6 is a flowchart illustrating the optical axis shift operation and the write operation of the pixel circuit.
Figure 7:
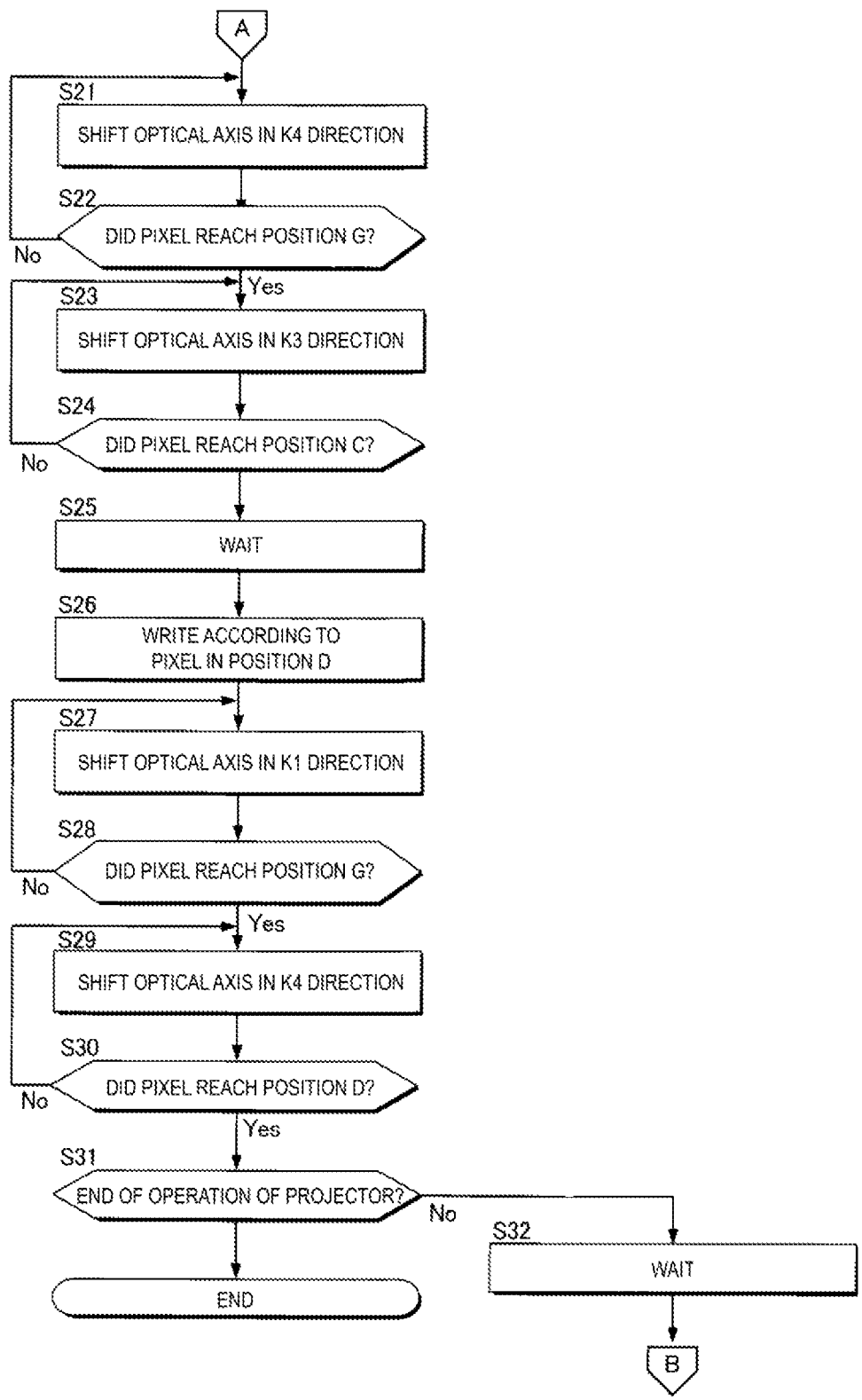
FIG. 7 is a flowchart illustrating the optical axis shift operation and the write operation of the pixel circuit.

FIG. 6 and FIG. 7 are flowcharts illustrating the optical axis shift operation and the write operation. Immediately before the start of one frame period F, the pixel Px is in position D, and data signal corresponding to position D is written to the liquid crystal element CL of each pixel circuit in the unit period Td of the previous frame.

In step S1 at the start of one frame period F, that is, at the start of the unit period Ta, the driving circuit 20 starts writing the data signal corresponding to position A to the liquid crystal element CL of each pixel circuit 40 and, in step S2, the timing signal generation unit 12 starts the operation of shifting the optical axis by the optical axis shifting element 100 in the K2 direction via the optical axis shifting element driving unit 14. Note that this shift operation, in step 3, is continued until the pixel Px reaches position G.

When the pixel Px reaches position G, in step S4, the timing signal generation unit 12 changes the shift direction of the optical axis by the optical axis shifting element 100 to the K1 direction. The shift operation in the K1 direction, in step S5, is continued until the pixel Px reaches position A.

Note that, when the pixel Px reaches position A, writing in the period T1 ends and, in step S6, the pixel Px is fixed in position A over the remaining period of the unit period Ta excluding the period T1 by waiting a certain period of time.

Next, in step S7 at the start of the unit period Tb, the driving circuit 20 starts writing the data signal corresponding to position B to the liquid crystal element CL of each pixel circuit 40 and, in step S8, the timing signal generation unit 12 starts the operation of shifting the optical axis by the optical axis shifting element 100 in the K3 direction via the optical axis shifting element driving unit 14. Note that this shift operation, in step S9, is continued until the pixel Px reaches position G.

When the pixel Px reaches position G, in step S10, the timing signal generation unit 12 changes the shift direction of the optical axis by the optical axis shifting element 100 to the K2 direction. The shift operation in the K2 direction, in step S11, is continued until the pixel Px reaches position B.

Note that, when the pixel Px reaches position B, writing in the period T2 ends and, in step S12, the pixel Px is fixed in position B over the remaining period of the unit period Ta excluding the period T2 by waiting a certain period of time.

Next, in step S13 at the start of the unit period Tc, the driving circuit 20 starts writing the data signal corresponding to position C to the liquid crystal element CL of each pixel circuit 40 and, in step S21, the timing signal generation unit 12 starts the operation of shifting the optical axis by the optical axis shifting element 100 in the K4 direction via the optical axis shifting element driving unit 14. Note that this shift operation, in step S22, is continued until the pixel Px reaches position G.

When the pixel Px reaches position G, in step S23, the timing signal generation unit 12 changes the shift direction of the optical axis by the optical axis shifting element 100 to the K3 direction. The shift operation in the K3 direction, in step S24, is continued until the pixel Px reaches position C.

Note that, when the pixel Px reaches position C, writing in the period T3 ends and, in step S25, the pixel Px is fixed in position C over the remaining period of the unit period Tc excluding the period T3 by waiting a certain period of time.

Then, in step S26 at the start of the unit period Td, the driving circuit 20 starts writing the data signal corresponding to position D to the liquid crystal element CL of each pixel circuit 40 and, in step S27, the timing signal generation unit 12 starts the operation of shifting the optical axis by the optical axis shifting element 100 in the K1 direction via the optical axis shifting element driving unit 14. Note that this shift operation, in step S28, is continued until the pixel Px reaches position G.

When the pixel Px reaches position G, in step S29, the timing signal generation unit 12 changes the shift direction of the optical axis by the optical axis shifting element 100 to the K4 direction. The shift operation in the K4 direction, in step S30, is continued by the optical shift element driving unit 14 until the pixel Px reaches position D.

Note that, when the pixel Px reaches position C, writing in the period T4 ends and, under the condition that the operation end instruction of the liquid crystal projector 1 has not been provided (the condition that the judgment result of step S31 is "No"), in step S32, the pixel Px is fixed in position D over the remaining period of the unit period Td excluding the period T4 by waiting a certain period of time. Subsequently, the processing procedure returns to step S1 to repeat the same operation for the next one frame period F.

In the first exemplary embodiment, when the pixels Px displayed on the projection surface SC is to be shifted from position A to position B, the optical axis shifting element 100 shifts the optical axis of the light emitted from the pixel circuit 40 using a path including the position G rather than the shortest linear path from position A to position B. Similarly, when the pixel Px is shifted from position B to position C, from position C to position D, and from position D to position A, the optical axis shifting element 100 shifts the optical axis of the light emitted from the pixel circuit 40 using a path including the position G.

Before a description of the shift path of the pixel Px according to the present exemplary embodiment is given, the problem that occurs when shifting is performed using the shortest path will be described.

Figure 8:
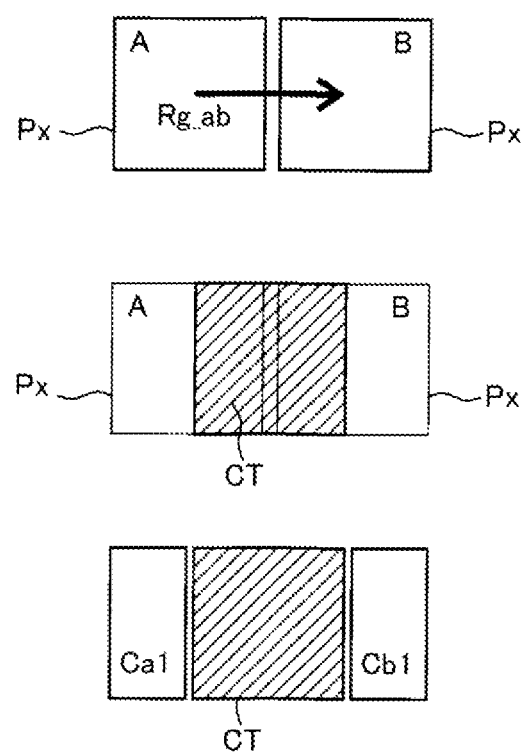
FIG. 8 is a diagram illustrating a problem when a pixel is shifted to two positions using a shortest path.

FIG. 8 is a diagram illustrating a case in which the pixel Px is shifted using a shortest path Rg_ab from position A to position B.

As described above, even when a target voltage is applied to a liquid crystal element, the transmittance of the liquid crystal element changes to a value corresponding to the applied voltage relatively slowly, not immediately. Thus, when shifting is performed using the shortest path Rg_ab from position A to position B, a change in brightness may be visually recognized in the transition process of the shift.

The brightness when the pixel Px is located in position A and the brightness when the pixel Px is located in position B is preferably individually visually recognized by the user, but when the brightness changes in the transition process of the shift, the change portion in brightness is also visually recognized by the user. As a result, the individual visibility of the brightness in position A and the brightness in position B deteriorates. Specifically, in the transition process of the shift from position A to position B, the change portion in brightness visually recognized by the user is concentrated in a region CT, which is in the middle of position A and position B. Thus, of the region of the pixel Px in position A, the region visually recognized at the target brightness is Ca1 excluding the region CT. Similarly, of the region of the pixel Px in position B, the region visually recognized at the target brightness is Cb1 excluding the region CT. Because both regions Ca1 and Cb1 are narrowed by half the region of the pixel Px, the individual visibility in position A and position B deteriorates.

Figure 9:
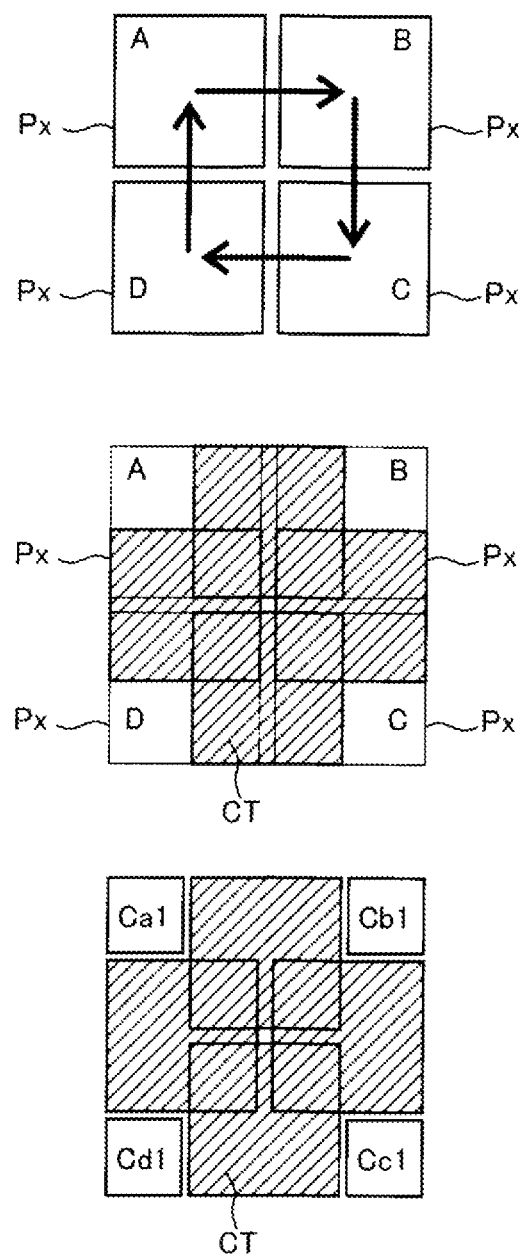
FIG. 9 is a diagram illustrating a problem when a pixel is shifted to four positions using a shortest path.

The description herein is for a case in which the pixel Px is limited to the shift from position A to position B. In actuality, because the pixel Px is further sequentially shifted from position B→position C→position D→position A, of the region of the pixel Px in positions A to D, the regions Ca1 to Cd1 visually recognized at the target brightness are reduced to approximately one-fourth the region of the pixel Px, as illustrated in FIG. 9. As a result, a reduction in resolution cannot be evaded.

Figure 10:
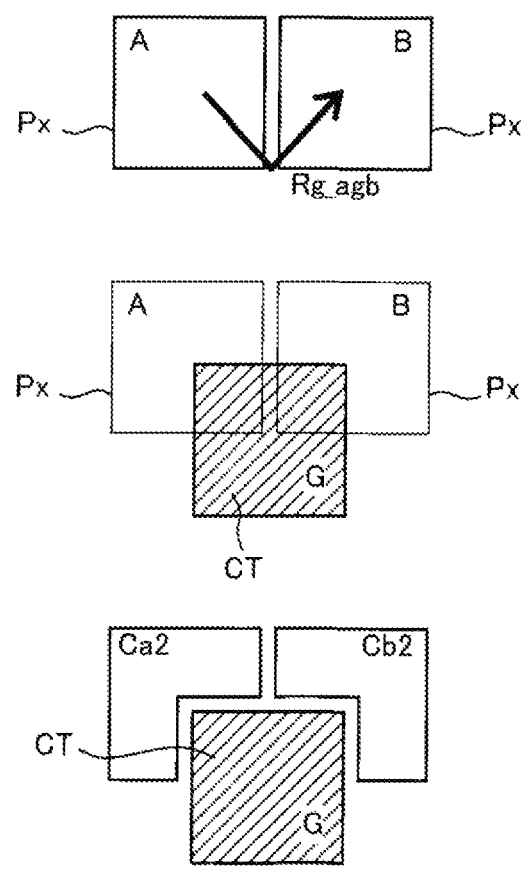
FIG. 10 is an explanatory view when a pixel is shifted to two positions using a path of a first exemplary embodiment.

FIG. 10 is a diagram illustrating a case in which the pixel Px is shifted using a path Rg_agb from position A to position B via position G, as in the present exemplary embodiment. In the transition process of the shift using the path Rg_agb, the change portion in brightness visually recognized by the user is concentrated in the region CT, that is, position G, which is in the middle of path. Here, of the region of the pixel Px in position A, the region visually recognized at the target brightness is Ca2 excluding the region CT. Similarly, of the region of the pixel Px in position B, the region visually recognized at the target brightness is Cb2 excluding the region CT. In the present exemplary embodiment, because both regions Ca2, Cb2 are about three-fourths the region of the pixel Px, deterioration of the individual visibility in position A and position B is suppressed.

Figure 11:
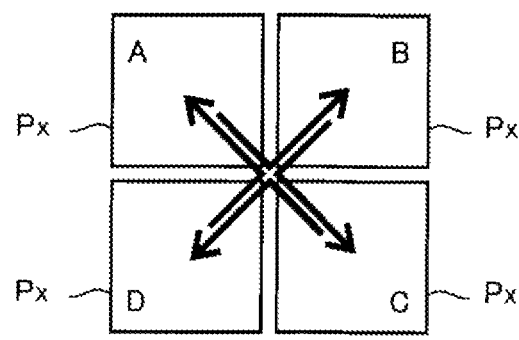
FIG. 11 is an explanatory view when a pixel is shifted to four positions using a path of the first exemplary embodiment.
Figure 11:
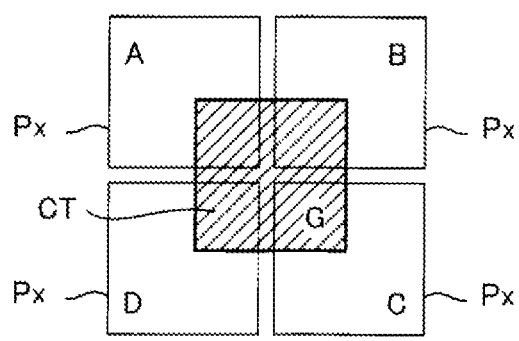
Figure 11:
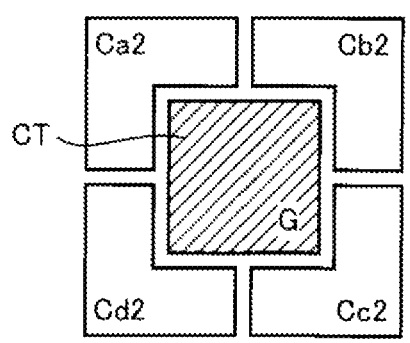

Even when the pixel Px is further sequentially shifted from position B→position C→position D→position A, of the region of the pixel Px in positions A to D, the regions Ca2 to Cd2 visually recognized at the target brightness are reduced to about three-fourths the region of the pixel Px, as illustrated in FIG. 11. Therefore, in the present exemplary embodiment, it is possible to suppress a reduction in resolution compared to when the shift is performed using the shortest path.

Figure 12:
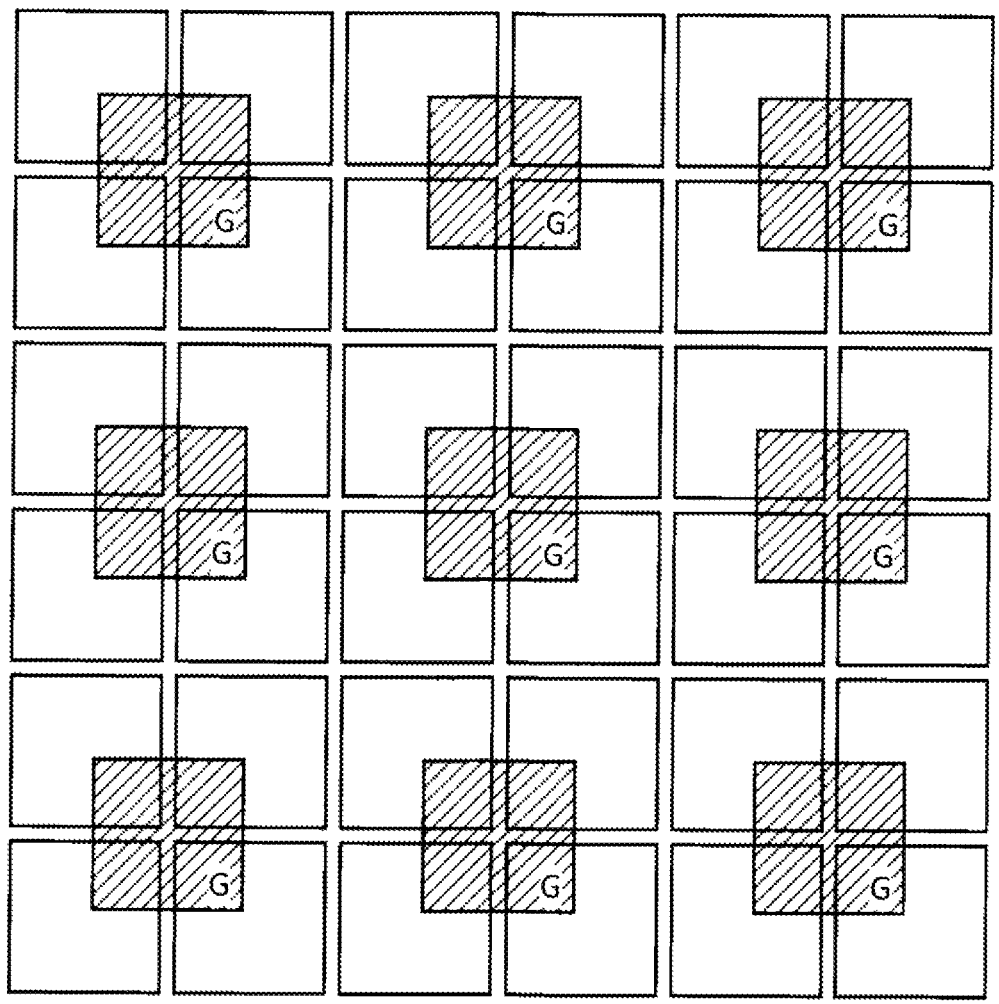
FIG. 12 is a diagram illustrating a relationship between four positions of a pixel and a region affected by a transition process in the first exemplary embodiment, including the periphery.

FIG. 11 is a diagram illustrating four pixels displayed by an optical axis shift, and FIG. 12 is a diagram illustrating a relationship between the surrounding 6×6 pixel area and the region CT (position G), which is a change portion in brightness due to shifting. As illustrated in FIG. 12, in the present exemplary embodiment, deterioration in individual visibility is suppressed in the same manner as in the peripheral pixels, and thus a reduction in resolution can be suppressed.

While, in the first exemplary embodiment, when the pixel Px is to be sequentially shifted from position A→position B→position C→position D (→position A), the pixel Px is configured to be shifted using a path through position G between each position, shifting may be performed using various other paths provided that the path is not the shortest.

Figure 13:
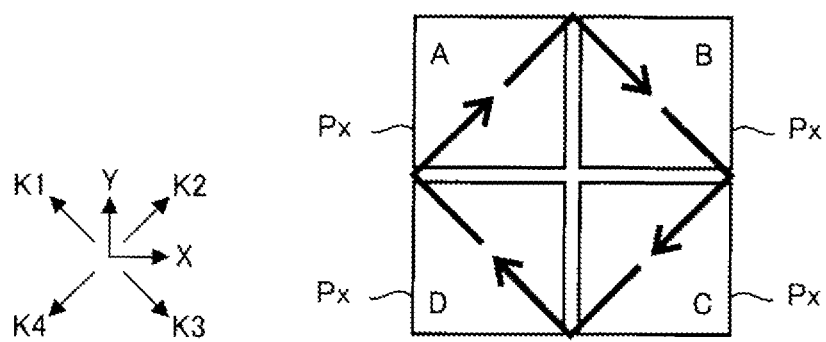
FIG. 13 is an explanatory view when a pixel is shifted to four positions using a path of a second exemplary embodiment.
Figure 13:
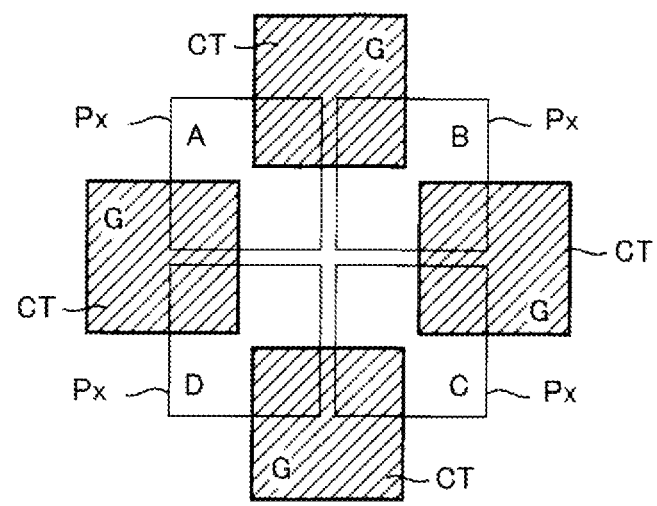
Figure 13:
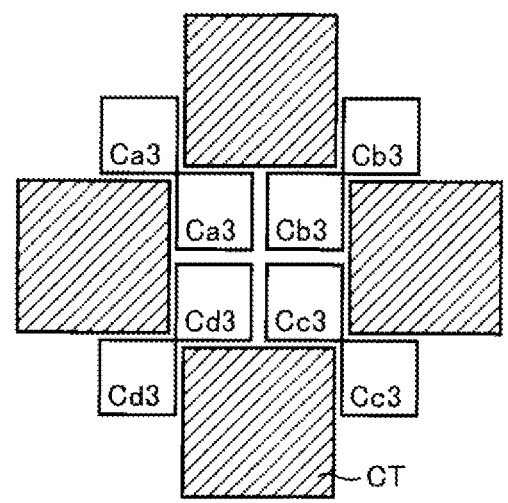

FIG. 13 is a diagram illustrating a shift path of the pixel Px in the second exemplary embodiment.

As illustrated in this figure, in the second exemplary embodiment, the pixel Px is shifted from position D by half of the diagonal of the pixel Px in the K1 direction, and subsequently to position A in the K2 direction. Next, the pixel Px is shifted from position A by half of the diagonal of the pixel Px in the K2 direction, and subsequently to position B in the K3 direction. That is, in the second exemplary embodiment, the pixel Px overlaps with position A and position B from position A to position B, but is shifted using a path including position G that does not overlap with position C and position D.

Next, the pixel Px is shifted from position A by half of the diagonal of the pixel Px in the K3 direction, and subsequently to position C in the K4 direction. Then, the pixel Px is shifted from position C by half of the diagonal of the pixel Px in the K4 direction, and subsequently to position C in the K1 direction. Simply put, the diagonal center of the pixel Px is shifted along four sides of a rhombus constituted by the diagonals of the pixel Px.

In this example, in the transition process of the shift, the region CT, which is a change portion in brightness visually recognized by the user, only half of one side of the pixel Px is distributed to four positions shifted in the ±X direction and the ±Y direction. Thus, because the regions Ca3 to Cd3 of brightness that should be visually recognized in positions A to D are, as illustrated in FIG. 13, about two-fourths the region of the pixel Px, a reduction in resolution can be suppressed.

Figure 14:
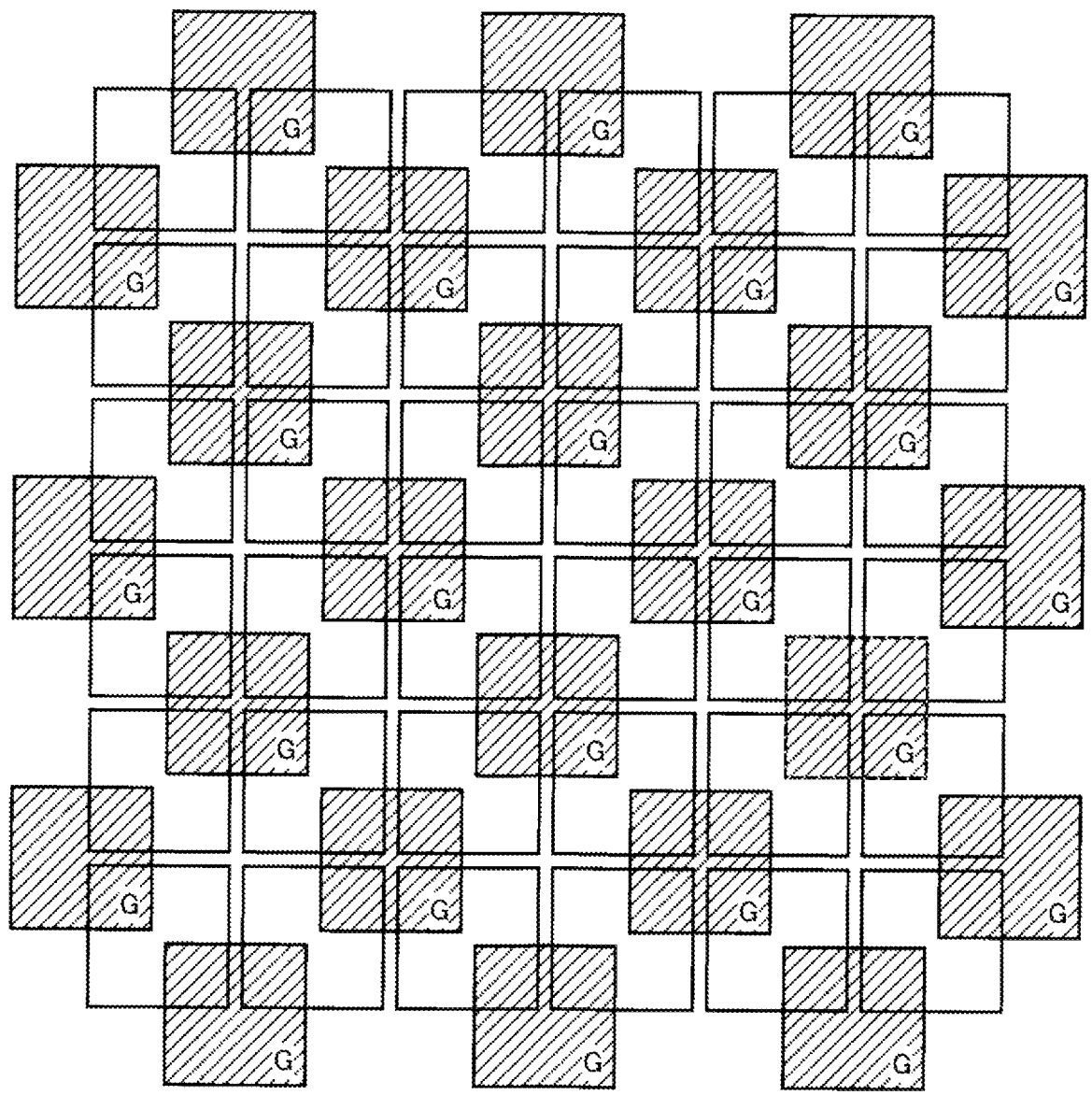
FIG. 14 is a diagram illustrating a relationship between four positions of a pixel and a region affected by a transition process in the second exemplary embodiment, including the periphery.

FIG. 14 is a diagram illustrating a relationship between the surrounding 6×6 pixel area and the region CT (position G), which is a change portion in brightness due to the shift illustrated in FIG. 13. As illustrated in FIG. 14, the region CT is distributed to four positions relative to the four pixels in position A to D, but each of the four positions is positioned at a timing that does not temporarily overlap with any of the four positions of the adjacent four pixels, and thus the ratio occupied by the region CT is less than that in FIG. 9.

Further, in the second exemplary embodiment, the distribution of the region CT relative to the arrangement of the pixels is uniform compared to the first exemplary embodiment (refer to FIG. 12), and thus improvements in visibility can be expected.

Figure 15:
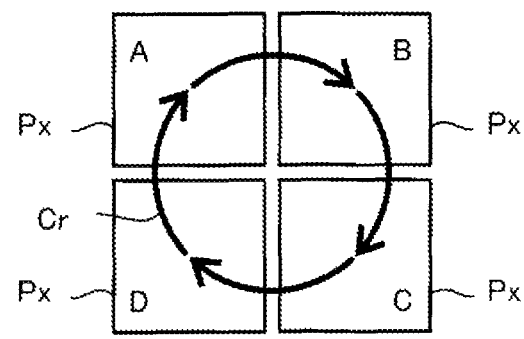
FIG. 15 is an explanatory view when a pixel is shifted to four positions using a path of a third exemplary embodiment.
Figure 15:
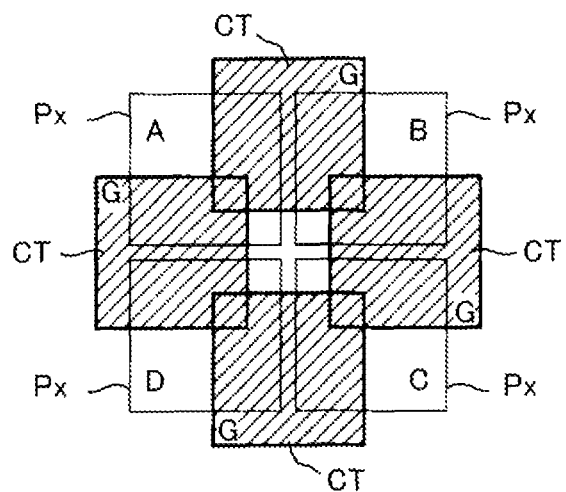
Figure 15:
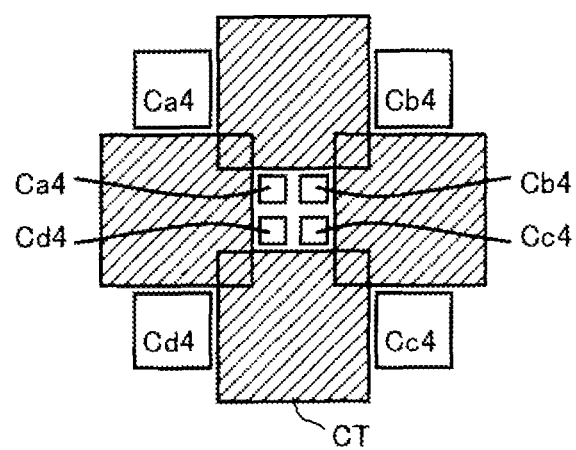

FIG. 15 is a diagram illustrating the path of the shift of the pixel Px in a third exemplary embodiment.

As illustrated in this figure, the diagonal center of the pixel Px is shifted along a circle Cr about four pixels of position A, position B, position C, position D and having a radius that is half of the diagonal of the pixel Px. In the process in which the center of the pixel Px is shifted along the circle Cr, the region CT, which is a change portion in brightness visually recognized by the user, is distributed to four positions similar to the example illustrated in FIG. 13. Compared to the example of FIG. 13, however, there is aggregation toward the center of the four pixels, and thus the regions Ca4 to Cd4 visually recognized at the target brightness at positions A to D are narrow compared to the example illustrated in FIG. 13.

However, in the present exemplary embodiment, the width is wide compared to the example of FIG. 9 in which shifting is performed using the shortest path, proving that a reduction in resolution can be suppressed.

Note that the shift path may be an ellipse rather than a circle, or curves and lines may be combined as appropriate. The key is that the path is not the shortest path.

Note that each of modes described above can also be identified as a method for controlling a projector.

What is claimed is:

1. A method for controlling a projector including:
    (i) a light source configured to radiate light, (ii) an electro-optical panel configured to receive light from the light source and emit the light, (iii) the projector configured to shift an optical axis of the light emitted from the electro-optical panel, the projector being configured to display a pixel on a projection surface, based on the light emitted from the electro-optical panel, the method comprising:
        driving the projector to shift a position of the pixel on the projection surface successively from a first position that is adjacent to a second position in a first direction, the projector driven to shift an optical axis of the light emitted from the electro-optical panel using a path different from a shortest path from the first position to the second position,
        driving the projector to shift a position of the pixel on the projection surface from the second position to a third position in a second direction intersecting with the first direction, the projector being driven to shift the optical axis of the light emitted from the electro-optical panel using a path different from a shortest path from the second position to the third position,
        driving the projector to shift a position of the pixel on the projection surface from the third position to a fourth position in a third direction opposite to the first direction, the projector being drive to shift the optical axis of the light emitted from the electro-optical panel using a path different from a shortest path from the third position to the fourth position, driving the projector to shift a position of the pixel on the projection surface from the fourth position to the first position in a fourth direction opposite to the second direction, the projector being driven to shift the optical axis of the light emitted from the electro-optical panel using a path different from a shortest path from the fourth position to the first position, and when shifting a position of the pixel on the projection surface from the first position to the second position, from the second position to the third position, from the third position to the fourth position, and from the fourth position to the first position, the projector is driven to shift the pixel on the projection surface using a path including a fifth position between each of the first and second positions, second and third positions, third and fourth positions, and fourth and first positions, wherein the fifth position is surrounded by the first position, the second position, the third position, and the fourth position.

* * * * *